United States Patent [19]

Martin et al.

[11] 4,339,349

[45] Jul. 13, 1982

[54] CORROSION INHIBITORS FOR LIMITED OXYGEN SYSTEMS

[75] Inventors: Richard L. Martin; Evelyn W. Purdy, both of St. Louis, Mo.

[73] Assignee: Petrolite Corporation, St. Louis, Mo.

[21] Appl. No.: 120,169

[22] Filed: Feb. 11, 1980

[51] Int. Cl.³ ............... C23F 11/16; C23F 11/18; C23F 11/14; C23F 11/12

[52] U.S. Cl. .............. 252/389 A; 252/8.55 D; 252/8.55 E; 422/7; 422/12; 422/13

[58] Field of Search ........ 252/389 A, 8.55 D, 8.55 E; 422/7, 12, 13

[56] References Cited

U.S. PATENT DOCUMENTS

| | | | |
|---|---|---|---|
| 3,146,208 | 8/1964 | Fisher | 252/389 A |
| 3,846,071 | 11/1974 | Redmore | 252/389 A |
| 3,909,447 | 9/1975 | Redmore et al. | 252/389 A |
| 3,959,177 | 5/1976 | Martin | 252/389 A |
| 4,042,323 | 8/1977 | Redmore et al. | 252/389 A |
| 4,051,029 | 9/1977 | Redmore et al. | 252/389 A |
| 4,078,291 | 2/1978 | Redmore et al. | 252/8.55 E |

*Primary Examiner*—Irwin Gluck
*Attorney, Agent, or Firm*—Sidney B. Ring; Hyman F. Glass

[57] ABSTRACT

This invention relates to compositions useful in a limited oxygen system characterized by containing at least one of the following:
(1) sulfur-oxygen phosphates
(2) quaternaries
(3) polyphosphate esters
(4) cyclic amidines
(5) trithiones.

Where the limited oxygen system is aqueous and sour the above compositions (1), (2) and (3) are preferred.

Where the limited oxygen system is sour and hydrocarbon/aqueous the above compositions (1), (2) and (4) are preferred.

Where the limited oxygen system is sweet and aqueous the above compositions (1) and (3) are preferred.

Where the limited oxygen system is sweet and hydrocarbon/aqueous the above compositions (3), (4) and (5) are preferred.

18 Claims, No Drawings

CORROSION INHIBITORS FOR LIMITED OXYGEN SYSTEMS

As the urgency for petroleum production increases, situations arise with increasing frequency where air (containing oxygen) comes in contact with normally anaerobic fluids. It has been observed for years that oil field fluids that contact air can become many times more corrosive and, independently, corrosion inhibitors are not as effective against ferrous metal corrosion under these conditions. These conditions are frequently difficult to diagnose and even more difficult to control.

In pumped producing wells, faster pumping in combination with reduced fluid flow into the well bore results in the annular space between outer casing and the production tubing no longer being filled with liquid. Pressures inside this space can become negative so air can be pulled into the gas filled cavity. In this rather commonly existing situation air can readily migrate to fluids in the region of the downhole pump causing corrosion damage there. In addition, air is picked up by the pump and forced up the production tubing causing additional corrosion damage to that tubing as well as sucker rods in the case of rod pumped wells.

Other instances of air contact with oil field fluids can occur because of secondary or tertiary recovery operations to recover more petroleum from the petroleum bearing formations within the earth. One example is in situ combustion operations which require air to be pumped into oil-bearing formations; not all of the oxygen in this air is consumed in the combustion and the excess gives rise to severe corrosion. A more common practice is that of pumping water into the formation to increase flow into producing wells in that formation. Air can be initially dissolved in this water if it is from a source at or near the earth's surface. If this water is being separated from produced fluid, it can pick up air during holding and pumping operations. In either case, air in these fluids can cause bad corrosion in both surface and downhole equipment. This corrosion also has serious indirect consequences because solid corrosion products form and cause plugging of in-line filters and even worse, can plug pores in the formation rock so the rate of water injection is diminished.

Before the discovery of the oxygen-sulfur phosphate corrosion inhibitors described in U.S. Pat. No. 4,075,291, the only solution to the air-contact-corrosion problem in pumped oil wells was to locate and eliminate any possible leak into the negative-pressure annular cavity. This is very difficult to accomplish in many cases, impossible in some.

In many oil field operations, contact of fluids with air is inevitable; two examples are the previously mentioned in situ combustion recovery stimulation, and the drilling fluids used to drill into potential petroleum bearing formations. With secondary recovery waters, however, the general rules are: Keep the air from contacting the water in the first place if at all possible; and, use chemical or mechanical scavengers to remove the oxygen if it does enter. When the water source is brine associated with produced petroleum, blanketing of holding tanks and pumps with gas-containing-no-oxygen is required to prevent air (oxygen) contact. As oil fields produce less natural gas and purchased gas prices increase, this practice becomes much less attractive. Other blanketing methods have been tried but have not proven effective at preventing oxygen entry.

In the event a water source is used which already contains oxygen—such as water from rivers, lakes, or shallow wells—chemical or mechanical scavenging is sometimes practical. Chemical reducing agents as described in U.S. Pat. Nos. 3,625,888 and 3,764,548 and elsewhere can be used to remove oxygen. Conditions must be controlled, however, so that oxygen removal is complete yet little unreacted excess scavenger remains. Mechanical scavenging can be accomplished by vacuum de-aeration treatment or counter-current scrubbing with a non-oxygen-containing gas. These methods also call for close control and are never applied to smaller quantities of water for economic reasons. In total, there are many systems where a one step corrosion inhibitor would be preferred and more economical than separate steps of scavenging and then addition of a corrosion inhibitor effective only in the absence of oxygen.

We have discovered that the compounds of this invention inhibit ferrous metal corrosion in oil field fluids such as found in systems for producing wells and in handling of secondary recovery fluids. These compounds find particular advantage when these fluids contact limited amounts of air, such as about 5 p.p.m. of oxygen in the corrosion fluids or below. Concentrations of oxygen in the fluids resulting from this contact may be so low that it is not detectable, such as about a few parts per billion, for example 10 parts per billion or less; yet the presence of this oxygen can have a strong influence on both corrosivity and the effectiveness of inhibitors. Our inhibitors have greatly increased effectiveness in these conditions.

The corrosion inhibitors of this invention are characterized in two categories, (1) one category is best for use in sour ($H_2S$-bearing) fluids that contact oxygen, (2) the second category is best for sweet fluids ($CO_2$—bearing, with no significant $H_2S$). Inhibitors in the first category include fatty quaternary ammonium compounds in conjunction with other components; these other components include one or more of the following: (1) sulfur-oxygen-phosphates, (2) polyphosphate esters, and (3) cyclic amidines such as imidazolines. Inhibitors in the second category include (1) polyphosphate esters in conjunction with one or more of cyclic amidine salts such as phosphate salts of imidazolines of the type described in U.S. Pat. No. 3,846,071, (2) sulfur-oxygen phosphates, and (3) trithiones. For aqueous fluids the optimum inhibitors in the first category are blends of sulfur-oxygen phosphates with polyphosphate esters and fatty quaternary ammonium compounds; for aqueous/hydrocarbon systems the optimum inhibitors in the first category are blends of cyclic amidines such as imidazolines with sulfur-oxygen phosphate compounds and fatty quaternary ammonium compounds. For aqueous fluids of the second category, the optimum inhibitors are sulfur-oxygen phosphates and polyphosphate esters; for aqueous/hydrocarbon fluids the optimum blend contains phosphate salts of cyclic amidines such as imidazolines, polyphosphate esters and trithiones.

Electrochemical polarization curves had shown the particular conditions responsible for ferrous metal corrosion when oxygen contacts both sour ($H_2S$) and sweet ($CO_2$) production fluids. The preferred test method for sour corrosion was to suspend linear polarization probes in brine made up with ferric ions and sparged with hydrogen sulfide. After fully saturating with hydrogen sulfide, the sparge was changed to air at a low flow rate.

This test duplicates the desired conditions in sour fluids because of the oxidizing power of ferric ions early in the test plus the further oxidizing power of oxygen from air later in the test. The test method for sweet fluids was to suspend linear polarization probes in a brine continuously sparged with a $CO_2$/air mixed gas. Electrochemical polarization tests showed that the particular gas ratio used gave a reasonable contribution of both $CO_2$ and oxygen to the corrosion and inhibition mechanisms. Test results correlated with field experience for established inhibitors in both categories.

Specifically, for sour fluid testing the starting brine was 3.5% sodium chloride containing 100 p.p.m. of ferric ions as ferric chloride. Two liter samples of this brine were sparged with hydrogen sulfide for 1½ hours at 1 cu ft/hr, held under argon for the next 1½ hours then sparged for the final twenty-one (21) hours of the tests with 0.5 cu ft/hr of air. Tests were constantly stirred at room temperature, corrosion rates were tabulated each hour, with averages being taken for the first five hour period and the final 19 hour period. For sweet fluid testing a mixed brine was used containing 17,000 p.p.m. $Na^+$, 2000 p.p.m. $Mg^{++}$, 390 p.p.m. $Ca^{++}$, 32,000 $Cl^-$, and 590 p.p.m. $SO_4^=$ sparged continuously with 5 to 1 mixed air/$CO_2$ in 2 liter stirred kettles. Corrosion rates were recorded at 5 and 24 hour periods and converted to percent protection. Corrosion inhibitors in these tests were added at 100 p.p.m. at the onset of the test. Data in the following Tables are expressed in percent protection except for the blanks where direct Mil per year (MPY) penetration units are given.

TABLE I

Typical Conventional Inhibitors

| Ex. | Inhibitor | SOUR TEST Averages | | | SWEET TEST Percent Protection | |
|---|---|---|---|---|---|---|
| | | 1st 5 Hrs | Final 19 Hrs | Overall | @ 5 Hrs. | @ 24 Hrs. |
| | None | 310 mpy | 250 mpy | 280 mpy | 125 mpy | 110 mpy |
| 1 | Pyridine Salt, W.S. | 80% | 43% | 62% | 20% | 45% |
| 2 | Imidazoline Salt, W.S. | 74% | 11% | 42% | 44% | 63% |
| 3 | MeCl Quat of Pyridine, W.S. | 76% | 40% | 58% | 28% | 73% |
| 4 | Polyimidazoline Salts, W.S. | 57% | 36% | 47% | — | — |
| 5 | Quat, Phosphate Ester, Sulfite Commercial Blend for $O_2$, W.S. | 83% | 18% | 50% | 20% | 54% |
| 6 | Imidazoline, O.S. | 80% | 47% | 64% | 36% | 59% |
| 7 | Imidazoline Phosphate, O.S. | 81% | 46% | 64% | 72% | 83% |
| 8 | Sulfur-Oxygen Phosphate, O.S. | 82% | 71% | 77% | 66% | 73% |

O.S. = Oil Soluble
W.S. = Water Soluble
Quat = quaternary

TABLE II

Inhibitors of This Invention

| Ex. | Inhibitor | SOUR TEST Averages | | | SWEET TEST Percent Protection | |
|---|---|---|---|---|---|---|
| | | 1st 5 Hrs. | Final 19 Hrs. | Overall | @ 5 Hrs. | @ 24 Hrs. |
| 1 | Concentrate of sulfur-oxygen phosphates, dimethyl benzyl coco quat and polyphosphate esters, W.S. | 94% | 80% | 87% | 76% | 91% |
| 2 | Commercial concentration of same, W.S. | 94% | 78% | 86% | 72% | 77% |
| 3 | Blend of imidazoline, sulfur-oxygen phosphates and dimethyl benzyl coco quat, O.S. | 92% | 76% | 84% | 29% | 59% |
| 4 | Blend of phosphate ester and sulfur-oxygen phosphates, W.S. | 94% | 70% | 82% | 86% | 93% |
| 5 | Blend of imidazoline phosphate, polyphosphate ester, and trithione, O.S. | 88% | 64% | 76% | 95% | 96% |

O.S. = Oil Soluble
W.S. = Water Soluble
Quat = quaternary

The preceding tests are all results where inhibitor was added at the very start of the test. The following Table shows data for the same sour-fluids test except the electrodes for each test were pre-corroded in ferric ion/hydrogen sulfide brine for two (2) hours before inhibitor was added. From the time of inhibitor addition, these tests were the same as the previous ones.

TABLE III

Pre-Corroded Limited Oxygen Tests

| Ex. | Inhibitor | Rate at 1 Hr. After Inhibition | Next 23 Hour Average |
|---|---|---|---|
| 1 | Imidazoline, O.S. | 88% | 62% |
| 2 | Pyridine Salt, W.S. | 92% | 58% |
| 3 | Sulfur-oxygen phosphate, O.S. | 83% | 75% |
| 4 | Imidazoline, sulfur-oxygen phosphate Blend, O.S. | 94% | 80% |
| 5 | Same as Table II, Ex. 1, W.S. | 97% | 85% |
| 6 | Same as Table II, Ex. 3, O.S. | 97% | 86% |

O.S. = Oil Soluble
W.S. = Water Soluble

Conclusions from these tests as summarized in Tables I, II, and III are:

1. Only in the very mild oxidizing conditions were any conventional inhibitors very effective; in the slightly stronger oxidizing conditions in sulfide saturated brine these compounds were no more than 47% effective.

2. Sulfur-oxygen phosphate inhibitors were equally effective in mild oxidizing conditions and considerably more effective in the slightly stronger oxidizing conditions than other existing inhibitors.

3. Inhibitors formulated according to this invention are more effective than any previous inhibitor, including sulfur-oxygen phosphates alone, against corrosion in all periods of the limited oxygen tests.

4. Inhibitors that are optimum in sour fluid limited oxygen tests are not necessarily optimum in sweet fluid limited oxygen testing, particularly the oil soluble blends.

5. The addition of fatty quaternaries have a pronounced effect at increasing activity of the present blends soon after the inhibitors are applied to precorroded steel surfaces.

The inhibitors according to this invention function primarily as corrosion inhibitors for ferrous metals in oil field fluids that contact air. One of the preferred blends, the sulfur-oxygen phosphates, polyphosphate esters, fatty quaternary blends have both anti-scale and deposit removal properties although these are not ends in themselves but merely aid in corrosion inhibition; this is true since the presence of scale or other second phase deposits can aggravate corrosivity and also interfere with inhibition. Patents have issued describing sulfur-oxygen phosphates and polyphosphate esters of this blend as both corrosion (U.S. Pat. Nos. 3,909,447 and 4,042,323) and scale (4,051,029) inhibition in aerated waters. U.S. Pat. No. 3,146,208 describes acid corrosion inhibition by phosphorodithionates alone and blended with a tetra alkyl quaternary ammonium compound plus iodides and bromides.

Another of the preferred blends, salts of imidazoline blended with sulfur-oxygen phosphates blended with fatty quaternaries also shows superior inhibition. The fatty quaternary helps the inhibitor to penetrate deposits to allow better inhibitor access to the metal surface. Although U.S. Pat. No. 3,959,177 discloses inhibition in oil field systems by an imidazoline-sulfur-oxygen phosphate trithione blend it does not describe the present invention.

The preferred blend for sweet systems, phosphate salt of imidazoline-polyphosphate esters and trithione, also has anti-scale properties which aid in corrosion inhibition. Scale is frequently a problem in aerated-sweet corrosion whereas corrosion product deposits are more often a problem in aerated-sour corrosion.

In summary, the present invention relates to corrosion inhibition in systems containing limited oxygen, i.e., about 5 ppm by weight or less of oxygen based on weight of corrosive fluids in contrast to anaerobic (non-oxygen) and aerobic systems (above about 5 ppm of oxygen).

In addition, limited oxygen systems are subdivided into sour ($H_2S$-containing) and sweet ($CO_2$-containing little if any $H_2S$) systems.

In addition, these systems are further subdivided into hydrocarbon soluble and aqueous soluble systems. This may be graphically presented as follows:

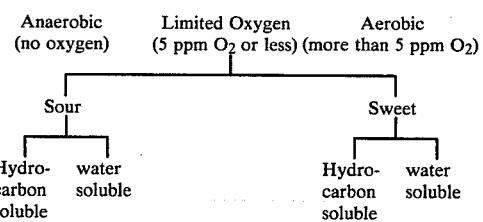

The effective corrosion inhibitors are included in the following table:

TABLE IV

| | Sour System | | | | Sweet System | | |
|---|---|---|---|---|---|---|---|
| Typical Ratio | Aqueous | Typical Ratio | Hydrocarbon/ Aqueous | Typical Ratio | Aqueous | Typical Ratio | Hydrocarbon/ Aqueous |
| 3 | sulfur-oxygen phosphates | 1 | sulfur-oxygen phosphates | 1 | sulfur-oxygen phosphates | 1 | Trithiones |
| 3 | fatty quaternaries | 1 | fatty quaternaries | 2 | polyphosphate esters | 3 | cyclic-amidines |
| 2 | polyphosphate esters | 1 | cyclic-amidines | | | 1 | polyphosphate esters |

The ratios in Table IV relate to the ratio of the solutions given in the following examples of specific formulations.

I. For Aqueous Sour Systems (a) Alcoholic solution of sulfur-oxygen phosphate (50%), (b) aqueous solution of dimethyl benzyl coco ammonium chloride (50%), and (c) polyphosphate ester of oxyalkylated Alfol 8-10 (67% aqueous solution). Ratios of the above solutions can vary from 10-1-1 to 0-10-1 to 0-1-5, for example from 5-1-1 to 1-5-1 to 1-1-2, preferably 2-1-1 to 1-2-1 to 1-1-1, with 3-3-2 optimum in many situations.

(a) is the reaction product of $P_2S_5$ and Alfol 8-10 reacted with 1/1 weight of ethylene oxide, resulting in a mixture of sulfur-oxygen phosphates.

(b) is

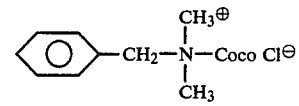

(c) is the reaction product of polyphosphonic acid and Alfol 8-10 reacted with 1/0.8 weight of ethylene oxide.

II. For Hydrocarbon Sour Systems (a) Hydrocarbon solution of dimer-trimer acid salts of imidazoline (approximately 37%), (b) hydrocarbon solution of sulfur-oxygen phosphate (50%), (c) a water-alcohol solution of dimethyl benzyl coco ammonium chloride (50%). Ratios of the above solutions can vary from 8-1-0 to 1-10-0 to 1-1-10, for example from 3-1-1 to 1-5-1 to 1-1-5, preferably 2-1-1 to 1-2-1 to 1-1-2, with 1-1-1 optimum in many situations.

(a) is the reaction product of tall oil acids and polyethylene polyamines; reacted with dimer-trimer acid to form the salt.

(b) is the reaction product of $P_2S_5$ and Alfol 8-10 reacted with 1/1 weight of ethylene oxide, resulting in a mixture of sulfur-oxygen phosphates.

(c) is

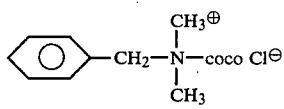

III. For Aqueous Sweet Systems (a) Alcoholic solution of sulfur-oxygen phosphate (50%), (b) aqueous solution of phosphate ester of oxyalkylated Alfol 8-10 (67%). Ratios of the above solutions can vary from 1-0 to 0-1, for example 20-1 to 1-20, preferably 5-1 to 1-10 with 1-2 being optimum in many situations.

(a) is reaction product of $P_2S_5$ and Alfol 8-10 reacted with 1/1 weight of ethylene oxide resulting in a mixture of sulfur-oxygen phosphates.

(b) is the reaction product of polyphosphonic acid and Alfol 8-10 reacted with 1/.8 weight of ethylene oxide.

IV. For Hydrocarbon Sweet Systems (a) Hydrocarbon solution of phosphate salts of imidazoline (approximately 45%), (b) aqueous solution of phosphate ester of oxyalkylated Alfol 8-10 (67%), and (c) alcoholic solution of quaternized trithiones (50%).

Ratios of the above solutions can vary from 20-0-1 to 1-20-0 to 1-0-20, for example 10-1-1to 1-10-1 to 1-1-2, preferably 5-1-1 to 1-5-1 to 1-1-1 with 3-1-1 being optimum for many situations.

(a) is an imidazoline salt of a phosphorylated ethoxylated Alfol 8-10.

(b) is the reaction product of polyphosphonic acid and Alfol 8-10 reacted with 1/.8 weight of ethylene oxide.

(c) is the methyl quaternary of 4-neopentyl-5-t-butyl-1,2-dithiole-3-thione.

A. (Poly)Phosphate Esters

The phosphate and polyphosphate esters of this invention are esters of phosphoric acid

or its equivalent. They are in essence phosphorylated alcohols. They are conveniently represented as esters wherein one or more of the OH groups is esterified with an alcohol ROH. Thus it may contain one, two, or three RO groups in place of the OH group. In general where orthophosphoric acid or polyphosphoric acid is reacted with an alcohol the mono- ester is the predominant product which may be ideally represented as

A wide variety of alcohols may be esterified to form phosphate esters. These include the following:

ROH where R has 2-30 carbons, such as 6-20 carbons, for example from 8-18 carbons, but preferably from 8-12 carbons.

A representative alcohol is "Alfol" 8-10 carbon alcohol.

Oxyalkylated alcohols can also be phosphorylated to form phosphate esters of $R(OA)_nOH$ where OA is the alkylene oxide such as ethylene oxide, propylene oxide, moiety and n is the number of alkylene oxide units, such as about 1-100, for example from about 1-50, such as from about 1-25, but preferably about 1-10.

Other specific examples of alcohols include the following:

Alcohols

Illustrative examples:

methyl, ethyl, propyl, butyl, pentyl, hexyl, octyl, ethylhexyl, decyl, dodecyl, tetradecyl, hexadecyl, octadecyl.

Ethoxylated derivatives of the above Other ethoxylates from phenols, e.g.

t-butylphenol, amylphenol, octylphenol, nonylphenol, dodecylphenol, di-t-butylphenol, dinonylphenol, etc.

Ethoxylated amines:

butylamine, ethylhexylamine, octylamine, dodecylamine, cocoamine, tallowamine, etc. Polyols, oxyalkylated ethyleneglycol, glycerol, trimethylolethane, trimethyl propane, etc.

The preferred polyphosphate ester includes the polyphosphoric acid esters of oxyalkylated Alfol 8-10.

Other polyphosphate ester include polyphosphoric acid esters of oxyalkylated trimethyl propane, polyphosphoric acid esters of oxyalkylated Alfol 12-14; and mono- and dialkyl phosphates of oxyalkylated branched $C_8$ alcohols.

B. Quaternaries

The quaternary ammonium compounds of this invention contain at least one quaternary ammonium group and are represented, for convenience, as Ⓝ ⊕ where Ⓝ ⊕ represents the quaternary ammonium moiety. These include mono-, di- and poly- quaternaries.

A more specific formula is expressed by the general formula

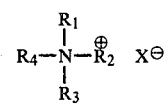

where N represents the quaternary ammonium nitrogen atom; $R_1$, $R_2$, $R_3$, $R_4$ may be hydrocarbon groups such as alkyl, aryl, aralkyl, cycloalkyl, alkenyl, substituted aryl, oxygen-containing hydrocarbons groups, etc.

The R's may be the same or different. Two of the R's may be joined together so as to form a nitrogen-containing ring.

At least one of the R's is fatty, i.e. having at least 6 carbons, such as from 6–20 carbons, for example from 8–18 carbons, but preferably from about 12–18 carbons.

The following are examples of the preferred quaternaries:

Good results were obtained using:
dimethyl dicoco ammonium chloride;
dimethyl benzyl oleyl ammonium chloride;
dimethyl benzyl alkyl ammonium chloride;

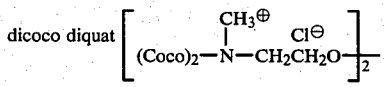

The following are examples of quaternaries which can also be employed:
trimethyl alkyl ammonium chloride;

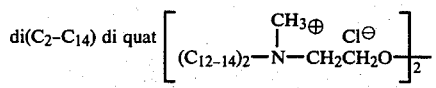

C. Sulfur-Oxygen Phosphates

The sulfur-oxygen phosphates of this invention are mixtures of thiophosphates, pyrophosphates containing both oxygen and sulfur, and oxygen phosphates. The mixtures are synergistically more effective as corrosion inhibitors than each component individually.

Although the reaction of simple alcohols with $P_2S_5$ primarily proceeds according to the following equation

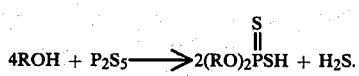

when certain alcohols are reacted, for example higher alkyl alcohols, phenols, oxyalkylated alcohols, etc., side reactions predominate. Thus,

initially formed from such alcohols yields, through anhydride formation and/or isomerization, pyrophosphates as illustrated in the following equations:

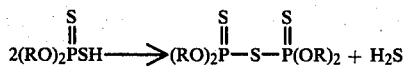

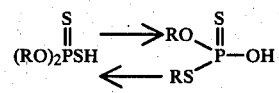

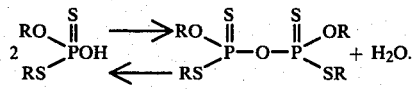

Although the ratio of products will vary with reactants, properties, reaction conditions, etc., a typical reaction product ratio of products formed by reacting an oxyalkylated alcohol with $P_2S_5$ is a follows:

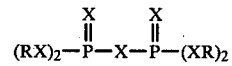 40%

(RO)$_2$PSH (RO)$_2$P—S—P—(OR)$_2$ 30%

30%

Thus, the major part of the product comprises anhydrides and/or isomerized anhydrides (i.e., pyrophosphates) which are excellent corrosion inhibitors, etc.

The production of pyrophosphates which contain both sulfur and oxygen of the formula $$(RX)_2-P-X-P-(XR)_2$$

where $X = O$ or $S$ in substantial amounts is unexpected since the reaction of simple alcohols, such as lower alkyl alcohols ROH, with $P_2S_5$ yields little, if any, pyrophosphates. See Houben-Weyl, Phosphorus Compounds, Part II, p. 684, published by Georg Thieme Verlag in 1964. In contrast where the more complex alcohols are reacted, for example, oxyalkylated alcohols such as of the formula $R(OA)_nOH$ where R is alkyl, cycloalkyl, alkenyl, aryl, aralkyl, alkaryl, heterocyclic, etc., higher alkyl alcohols such as where R has at least seven carbon atoms, etc., pyrophosphates comprise a substantial part of the resultant reaction product. In general, the yield of pyrophosphate is increased by prolonged heating. Thus, in order to increase the yield of pyrophosphates, in contrast to reaction time of 1–3 hours for the dialkyl dithiophosphates, reaction times at elevated temperatures of more than 3 hours, such as 3–15 or more hours, enhance the yield of pyrophosphates. The use of vacuum or reduced pressure during this heating period also enhances the yield of pyrophosphates, e.g., 20 mm–150 mm.

The general procedure for reacting alcohols with $P_2S_5$ to form dithiophosphoric acids is to continue reaction until most of the $P_2S_5$ has dissolved and the evolution of $H_2S$ has subsided. In contrast, the general procedure for preparing the pyrophosphates is to continue the reaction past this point so as to shift the equilibrium in favor of converting the dithiophosphoric acids to the pyrophosphate.

Since the crude reaction products contain O,O-disubstituted dithiophosphoric acids

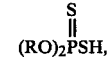

salts of these can also be prepared.

The salts are prepared by the simple neutralization of the acid with a suitable salt-forming base or by double decomposition, salt moiety may be for example, Cu, Ni, Al, Pb, Hg, Cd, Sn, Zn, Mg, Na, K, NH$_4$, amine, Co, Sr, Ba, etc. These may be prepared from the corresponding oxide, hydroxide, carbonate, sulfide, etc. An alternative to the preparation of salts is to use a simple combination of dithiophosphate with a metal salt such as zinc chloride, zinc sulfate, etc. This allows the use of higher stoichiometric amounts of metal ions to dithiophosphate, such as from 1:1 to 4:1.

The alcohols employed to prepare the ester may be oxyalkylated alcohols for example of the formula $$R(OA)_nOH$$

where OA is a moiety derived from an alkylene oxide and n is a number for example from about 1–100 or more, for example from 1–50, such as from 1–25, but preferably from 1–10.

The alkylene oxides employed herein are 1,2-alkylene oxides of the formula

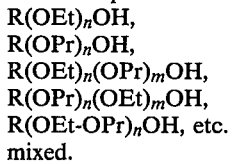

where $R_1$, $R_2$, $R_3$ and $R_4$ are selected by the group consisting of hydrogen, aliphatic, cycloaliphatic, aralkyl, etc. for example ethylene oxide, propylene oxide, butylene oxide, amylene oxide, octylene oxide, styrene oxide, methyl styrene oxide, cyclohexene oxide (where $R_1$ and $R_3$ are joined to make a ring), etc.

The alkylene oxide may be added to form homo polymer, stepwise to form block polymers, as mixtures to form heteropolymers or combinations thereof, etc.

For Example
$R(OEt)_nOH$,
$R(OPr)_nOH$,
$R(OEt)_n(OPr)_mOH$,
$R(OPr)_n(OEt)_mOH$,
$R(OEt\text{-}OPr)_nOH$, etc.
mixed.

These phosphates derived from $P_2S_5$ are designated in the following discussion as Type A. These materials are significantly improved as corrosion inhibitors and scale inhibitors by mixing with non-sulfur containing phosphates designated as Type B.

The Type B phosphates preferredly are formed by phosphorylation of the alcohols described above using reagents as phosphorus pentoxide, polyphosphoric acid, phosphorus oxychloride, etc.

Examples 1–5 illustrate the thiophosphate materials and Examples 6–14 the non-sulfur containing phosphate esters.

The reaction of alcohols with $P_2O_5$ is carried out in the conventional manner. It may be summarized by the following idealized equation

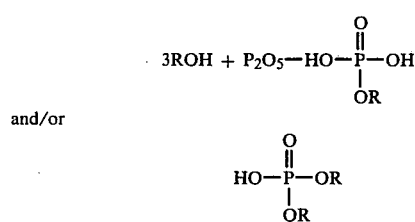

and/or

In general, the alcohols employed in preparing the oxygen phosphates are the same as that employed with the thiophosphates.

C. Series of Examples

The following examples illustrate thiophosphate compounds: (Type A)

EXAMPLE 1

The alcohol derived from the addition of 1 weight of ethylene oxide to "Alfol" 8–10 (576 g; 2 mole) was stirred at 25°–40° C. while $P_2S_5$ (111 g; 0.5 mole) was added during 2 hours. The reaction was heated to 105°–109° at a pressure of 70 mm for 9½ hours. Upon cooling the product, 657 g. was obtained as a pale yellow liquid. Sulfur analysis, 9.06%; phosphorus, 4.77%; acid value 0.62 meg/g. The product was neutralized with anhydrous ammonia.

EXAMPLE 2

The alcohol derived from the addition of 1 weight of ethylene oxide to "Alfol" 8–10 (288 g; 1 mole) was stirred at 70°–75° C. while $P_2S_5$ (55 g; 0.25 mole) was added in 60 mins. The reaction mixture was heated at 100°–110° under reduced pressure (75 mm) for 8 hours as $H_2S$ was evolved. The resulting acid was neutralized with dimethyl aniline.

EXAMPLE 3

The alcohol derived from the addition of 2 weights of ethylene oxide to "Alfol" 8–10 (432 g; 1 mole) was stirred at 70°–75° C. during the addition of $P_2S_5$ (55 g; 0.25 mole). The addition was complete in 60 min. and heating was continued at 100°–110° for 10 hours to complete $H_2S$ evolution. Neutralization was effected by the addition of anhydrous ammonia.

The following examples use higher $P_2S_5$ ratios.

EXAMPLE 4

The alcohol derived from the addition of 1 weight of ethylene oxide to "Alfol" 8–10 (288 g; 1 mole) was heated at 75°–80° C. while $P_2S_5$ (70 g; 0.315 mole) was added during 45 min. The mixture was heated at 100°–105° C. for 3 hours at which time $H_2S$ evolution was complete. After cooling to 70° tributylamine (42 g) was added and the mixture stirred at 70°–75° for 1 hour to complete neutralization.

EXAMPLE 5

The alcohol derived from the addition of 1 weight of ethylene oxide to "Alfol" 8–10 (288 g; 1 mole) was heated at 75°–80° C. with stirring while $P_2S_5$ (70 g; 0.315 mole) was added in 45 min. The mixture was heated at 100°–110° for 4 hours to complete evolution of $H_2S$. After cooling to 65° C. anhydrous ammonia (5 g) was added to effect neutralization.

The following examples illustrate non-sulfur containing phosphates (Type B).

EXAMPLE 6

To the alcohol derived from the addition of 0.8 weight of ethylene oxide to "Alfol" 8–10 (180 g; 0.7 mole) was carefully added phosphorus pentoxide (33 g; 0.23 mole). The reaction mixture spontaneously rose to 90° upon this addition. The reaction was completed by heating at 125° C. for 1 hour to yield a straw colored liquid.

EXAMPLE 7

To the alcohol derived from 2-ethylhexanol with 1 weight of ethylene oxide added (130 g; 1 mole) was added phosphorus pentoxide (47 g; 0.33 mole) during 10 mins. This addition resulted in an exotherm taking the temperature to 75°. The phosphorylation was completed by heating at 110° for 1½ hours yielding a pale yellow liquid.

EXAMPLE 8

To the alcohol derived from the addition of 1 weight of ethylene oxide to "Alfol" 8-10 (130 g; 0.45 mole) was added polyphosphoric acid (77 g; 0.45 mole) in 15 mins. This addition resulted in a temperature increase to 70°. The reaction was then heated at 110°–112° for 1 hour to complete the reaction. The product was a viscous amber liquid.

The following tables present additional illustrative examples:

| Example No. | Alcohol | Phosphorylating Reagent | Procedure |
|---|---|---|---|
| 9 | "Alfol" 8-10 + 1 weight EtO* | $P_2O_5$ | Example 6 |
| 10 | "Alfol" 14 + 0.5 weight EtO | $P_2O_5$ | Example 6 |
| 11 | "Alfol" 8-10 + 0.8 weight EtO | Polyphosphoric Acid | Example 8 |
| 12 | "Alfol" 14 + 0.5 weight EtO | Polyphosphoric Acid | Example 8 |
| 13 | "Alfol" 8-10 | $P_2O_5$ | Example 6 |
| 14 | 2-ethyl hexanol | $P_2O_5$ | Example 6 |

*EtO = Ethylene Oxide
"Alfol" - linear alcohols, number indicates predominant carbon chain.

The weight ratio of thiophosphate and/or pyrophosphate to phosphate can vary widely for example from about 10:1 to 1:10, such as from about 5:1 to 1:5, for example from about 3:1 to 1:3, but preferably from about 2:1 to 1:2.

D. Cyclic Amidine Salts of Acidic Phosphate Esters of Oxyalkylated Alcohols

A cyclic amidine salt, where the salt moiety is an acidic phosphate ester of an oxyalkylated alcohol, either employed alone or in conjunction with a carboxylic acid, i.e., a binary cyclic amidine-oxyalkylated phosphate salt or a tertiary cyclic amidine-oxyalkylated phosphate-carboxylate salt, are described in U.S. Pat. No. 3,846,071, Nov. 5, 1974, which is by reference incorporated herein as if part hereof.

The phosphate ester may be ideally presented as follows:

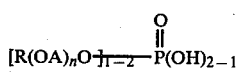

where R is an alcohol moiety for example hydrocarbon such as alkyl, alkenyl, aryl, alkaryl, aralkyl, etc. $(OA)_n$ is derived from an alkylene oxide or a plurality of alkylene oxides so as to yield homo, block, hetero, etc. units and n is a number determined by the components of the system such as the type and number of carbons in R, the type and number of moles of alkylene oxides employed, etc. For example, n is 1–100 or more, such as 1–50, for example 2–25, but preferably 2 to 10.

The cyclic amidine may be ideally represented by the following idealized formula:

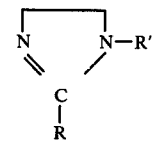

where R–C is the moiety derived from the carboxylic acid or equivalent and R' is the moiety derived from the aryl, alkaryl, aralkyl, etc.

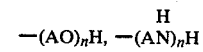

acylated derivatives thereof, etc. Also included within the term "cyclic amidine" are those of the following type:

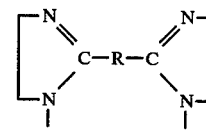

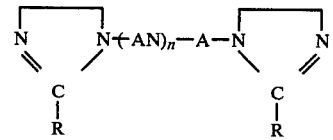

polymers having cyclic amidines within the main chain as illustrated in U.S. patent application Ser. No. 502,636 filed Oct. 22, 1965, now U.S. Pat. No. 3,531,496 and U.S. application Ser. No. 442,793, filed Mar. 25, 1965, now U.S. Pat. No. 3,445,441, and polymers having dangling cyclic amidine groups as illustrated in U.S. patent application Ser. No. 520,833 filed Jan. 17, 1966, now U.S. Pat. No. 3,488,294, for example, of the general formula

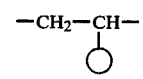

where
◯ is a pendant cyclic amidine group.

D. Series of Examples

The following examples are presented for purpose of illustration and not of limitation.

TABLE VI $$\underset{R}{\boxed{N{\diagdown}\!\!\!\diagup N}}-(CH_2CH_2NH)_nH + \left[R'\left[OCH_2\underset{R''}{CH}-\right]_xO\right]_y \overset{O}{\underset{\|}{P}}(OH)_{3-y}$$

| Ex. | R | n | R' | R'' | x | y | Wt. ratio, amidine/phosphate |
|---|---|---|---|---|---|---|---|
| 1 | $C_{17}H_{33}$ | 1 | $C_{14}H_{29}$ | H | 4.6 | 1 | 1.5 |
| 2 | $C_{17}H_{33}$ | 1 | $C_{14}H_{29}$ | H | 4.6 | 1 | 2.8 |
| 3 | $C_{17}H_{33}$ | 2 | $C_{14}H_{29}$ | H | 4.0 | 1 | 2.0 |
| 4 | $C_{17}H_{33}$ | 2 | $C_{14}H_{29}$ | H | 4.0 | 1 | 3.0 |
| 5 | $C_{17}H_{33}$ | 1 | $C_{14}H_{29}$ | H | 4.6 | 2 | 1.5 |
| 6 | $C_{17}H_{33}$ | 1 | $C_{14}H_{29}$ | H | 4.6 | 2 | 2.8 |

TABLE VI-continued $$\underset{R}{\overset{\displaystyle N\diagdown\hspace{-1em}\diagup N}{\bigvee}}-(CH_2CH_2NH)_nH + \left[ R'\left[ OCH_2CH-\atop R'' \right]_x O \right]_y \overset{O}{\underset{\|}{P}}(OH)_{3-y}$$

| Ex. | R | n | R' | R'' | x | y | Wt. ratio, amidine/phosphate |
|---|---|---|---|---|---|---|---|
| 7 | $C_{17}H_{33}$ | 1 | $C_{8-10}$ Alfol mixture | H | 3.2 | 1 | 2.5 |
| 8 | $C_{17}H_{33}$ | mixed 5–10 | $C_{8-10}$ Alfol mixture | H | 3.2 | 1 | 1.2 |
| 9 | $C_{17}H_{33}$ | 1 | $C_{8-10}$ Alfol mixture | H | 2.4 | 1 | 2.4 |
| 10 | $C_{17}H_{33}$ | 2 | $C_{8-10}$ Alfol mixture | H | 2.4 | 1 | 2.4 |
| 11 | $C_{11}H_{23}$ | 1 | $C_{14}H_{29}$ | H | 4.6 | 1 | 2.0 |
| 12 | $C_{17}H_{33}$ | 2 | p-Nonyl phenyl | H | 4.0 | 1 | 2.0 |
| 13 | $C_{11}H_{23}$ | 1 | " | H | 4.0 | 2 | 2.0 |
| 14 | $C_{17}H_{35}$ | 1 | " | H | 4.0 | 1 | 2.4 |
| 15 | $C_{17}H_{35}$ | (1) | " | H | 4.0 | 1 | 2.0 |

(1) Mixture 1, 2 and 3n units

It is to be noted that the cyclic amidine has an amino-containing chain. This side chain may be employed in an unmodified form, i.e.

or may be modified by further reaction such as by acylation or the like, i.e.

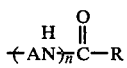

where R is the moiety of a carboxylic acid, for example any of those employed in preparing the cyclic amidine. These are illustrated by the following examples:

TABLE VII $$\underset{R}{\overset{\displaystyle N\diagdown\hspace{-1em}\diagup N}{\bigvee}}N(CH_2CH_2NH)_n\overset{O}{\underset{\|}{C}}R + \left[ R'\left[ OCH_2-CH-\atop R'' \right]_x O \right]_y \overset{O}{\underset{\|}{P}}(OH)_{3-y}$$

| Ex. | R | n | R' | R'' | x | y | Wt. ratio, imidazoline/phosphate |
|---|---|---|---|---|---|---|---|
| 16 | $C_{17}H_{33}$ | 1 | $C_{14}H_{29}$ | H | 4.6 | 1 | 2.0 |
| 17 | $C_{17}H_{33}$ | 2 | $C_{14}H_{29}$ | H | 4.6 | 1 | 2.4 |
| 18 | $C_{17}H_{33}$ | 1 | $C_{14}H_{29}$ | H | 4.6 | 2 | 2.0 |
| 19 | $C_{11}H_{23}$ | 1 | $C_{14}H_{29}$ | H | 4.6 | 1 | 1.8 |
| 20 | $C_{11}H_{23}$ | 1 | $C_{14}H_{29}$ | H | 4.6 | 2 | 2.0 |
| 21 | $C_{11}H_{23}$ | 2 | p-Nonylphenyl | H | 4.0 | 1 | 2.0 |
| 22 | $C_{17}H_{35}$ | 1 | $C_{14}H_{29}$ | H | 4.6 | 1 | 2.0 |
| 23 | $C_{17}H_{35}$ | 1 | $C_{14}H_{29}$ | H | 4.6 | 2 | 2.0 |
| 24 | $C_{17}H_{35}$ | (1) | p-Nonylphenyl | H | 4.0 | 1 | 2.4 |
| 25 | $C_{17}H_{35}$ | (1) | p-Nonylphenyl | H | 4.0 | 2 | 2.4 |
| 26 | $C_{17}H_{33}$ | 1 | $C_{8-10}$ Alfol mixture | $CH_3$ | 2.0 | 2 | 2.0 |
| 27 | $C_{17}H_{33}$ | 1 | $C_{8-10}$ Alfol mixture | $CH_3$ | 2.0 | 2 | 3.0 |
| 28 | $C_{17}H_{33}$ | 2 | $C_{8-10}$ Alfol mixture | $CH_3$ | 2.0 | 2 | 2.4 |

(1) Mixture 1, 2 and 3n units

The molar ratio of phosphate to cyclic amidine may vary widely. However, in practice one employs a molar ratio of from about 0.1 to 5.0 or more, such as from about 0.2 to 2.0 for example from about 0.25 to 1.0. Optimum corrosion inhibition is achieved at a molar ratio of about 0.5±0.25.

In addition part of the phosphate moiety may be replaced with other acids such as carboxylic acid, for example, those employed in preparing the cyclic amidines, in ratios that do not substract substantially from the function of the compound. Thus, for example, one-half of the above molar ratio may be replaced with a carboxylic acid such as from ⅓ to ¼ of the molar ratio. Stated another way, these are mixed cyclic amidine-phosphate-carboxylate salts. Any of the carboxylic acid employed in making the cyclic amidine can be employed as the carboxylate moiety. The molar ratio of cyclic amidine-phosphate-carboxylate may be for example from about 1 to 10, 1 to 10, 80 to 5, but preferably from about 1 to 5, 1 to 4, 0 to 3.

E. Cyclic Amidines

The expression "cyclic amidine" is employed in its usual sense to indicate ring compounds in which ring there are present either 5 or 6 members, and having 2 nitrogen atoms separated by a single carbon atom supplemented by either two or three additional carbon atoms to complete the ring. All the carbon atoms and that nitrogen atom of the ring involving two monovalent linkages may be substituted. Needless to say, these compounds include members in which the substituents also may have one or more nitrogen atoms, either in the form of amino nitrogen atoms or in the form of acylated nitrogen atoms.

These cyclic amidines are further characterized as being substituted imidazoline and tetrahydropyrimidines in which the 2-position carbon of the ring is generally bonded to a hydrocarbon radical or comparable radical derived from an acid, such as a low molal fatty acid, a high molal fatty acid, or comparable acid, polycarboxy acid and the like.

For details of the preparation of imidazolines, substituted in the 2-position, from amines, see the following U.S. Patents Nos.: U.S. No. 1,999,989, dated Apr. 30, 1935, Max Bockmuhl et al.; U.S. No. 2,155,877, dated Apr. 25, 1939, Edmund Waldmann et al.; and U.S. No. 2,155,878, dated Apr. 25, 1939, Edmund Waldmann et al. Also see Chem. Rev. 32, 47 (43), and Chem. Rev. 54, 593 (54).

Equally suitable for use in preparing compounds useful for the preparation of tetrahydropyrimidines substituted in the 2-position are the polyamines containing at least one primary amino group and at least one secondary amino group, or another primary amino group separated from the first amino group by three carbon atoms, instead of being separated by only 2 carbons as with imidazolines. This reaction, as in the case of the imidazolines, is generally carried out by heating the reactants to a temperature at which 2 moles of water are evolved per mole of carboxylic group and ring closure is effected. For details of the preparation of tetrahydropyrimidines, see German Pat. No. 700,371 and U.S. Pat. No. 2,194,419.

Substituted imidazolines and tetrahydropyrimidines are obtained from a variety of acids beginning with the one-carbon acid (formic) through and including higher fatty acids or the equivalent having as many as 32 or more carbon atoms, for example, from 8–22 carbons. Modified fatty acids also can be employed, as for example, phenyl-stearic acid or the like. Cyclic acids may be employed, including naphthenic acids. A variety of other acids including benzoic acid, substituted benzoic acid, alicyclic acids, and the like, have been employed to furnish the residue.

from the acid RCOOH in which the C of the residue

is part of the ring. The fatty acids employed, for example, may be saturated or unsaturated. Branched long-chain fatty acids may be employed. See J. Am. Chem. Soc. 74, 2523 (1952). This applies also to the lower-molecular-weight acids as well.

Among sources of such acids may be mentioned straight-chain and branched-chain, saturated and unsaturated, aliphatic, cycloaliphatic, aromatic, hydroaromatic, aralkyl acids, etc.

Examples of saturated aliphatic monocarboxylic acids comprise: acetic, propionic, butyric, valeric, caproic, heptanoic, caprylic, nonanoic, capric, undecanoic, lauric, tridecanoic, myristic, pentadecanoic, palmitic, heptadecanoic, stearic, nondecanoic, eicosanoic, hencicosanoic, dodosanoic, triconsanoic, tetrasanoic, pentacosanoic, cerotic, heptacosanoic, montanic, nonacosanoic, melissic and the like.

Examples of ethylene unsaturated aliphatic acids comprise: acrylic, methacrylate, crotonic, anglic, tiglic, the pentenoic acids, the hexenoic acids, for example, hydrosorbic acid, the heptenoic acids, the octenoic acids, nonenoic acids, the decenoic acids, for example, obtusilic acid, the undecenoic acids, the dodencenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elaidic acid, the nonadecenoic acids, for example, the eicosenoic acids, the docosenoic acids, for example, erucic acid, brassidic acid, cetoleic acid, the tetracosenic acids, and the like.

Examples of dienoic acids comprise the pentadienoic acids, the hexadienoic acids, for example, sorbic acid, the octadienoic acids, for example, linoleic, and the like.

Examples of the trienoic acids comprise the octadecatrienoic acids, for example, linolenic acid, eleostearic acid, pseudo-eleostearic acid, and the like.

Carboxylic acids containing functional groups such as hydroxy groups can be employed. Hydroxy acids, particularly the alpha-hydroxy acids, comprise glycolic acid, lactic acid, the hydroxyvaleric acids, the hydroxycaproic acids, the hydroxyheptanoic acids, the hydroxycaprylic acids, the hydroxynonanoic acids, the hydroxycapric acids, the hydroxydecanoic acids, the hydroxylauric acids, the hydroxytridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelaidic acid, hydroxyoctadecynoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxyacids comprise ricinoleyllactic acid, acetylricinoleic acid, chloroacetylricinoleic acid, and the like.

Examples of the cyclic aliphatic carboxylic acids comprise those found in petroleum called naphthenic acids, hydnocarpic and chaulmoogric acids, cyclopentane carboxylic acids, cyclohexanecarboxylic acids, campholic acid, fencholic acids, and the like.

Examples of aromatic monocarboxylic acids comprise benzoic acid, substituted benzoic acids, for example, the toluic acids, the xylenoic acids, alkoxybenzoic acid, phenylbenzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soybean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acids; aralkyl and aromatic acids, such as Twitchell fatty acids, naphthoic acid, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids, comprise those of the aliphatic series, for example, oxalic, malonic, succinic, glutaric, adipic, pimelic, suberic, azelaic, sebacic, nonanedicarboxylic acid, decanedcarboxylic acids, undecanedicarboxylic acids, and the like.

Examples of unsaturated aliphatic polycarboxylic acids comprise fumaric, maleic, mesoconic, citraconic, glutonic, itaconic, muconic, aconitric acids, and the like.

Examples of aromatic polycarboxylic acids comprise isophthalic acids, terephthalic acids, substituted derivatives thereof (e.g. alkyl, chloro, alkoxy, etc. derivatives), biphenyldicarboxylic acid, diphenylether dicarboxylic acids, diphenylsulfone dicarboxylic acids and the like.

Other polycarboxylic acids comprise the dimeric, trimeric and poly acids, for example, the Emery Industries polymeric acids such as those described in U.S. Pat. 2,763,612, and the like. Other polycarboxylic acids comprise those containing ether groups, for example, diglycolic acid. Mixtures of the above acids can be advantageously employed.

In addition, acid precursors such as esters, acid chlorides, glycerides, etc., can be employed in place of the free acid in calculating the stoichiometry of acylating the hydroxaliphatic cyclic amidines.

Thus, cyclic amidines within the scope of this invention comprise compounds of the formulae:

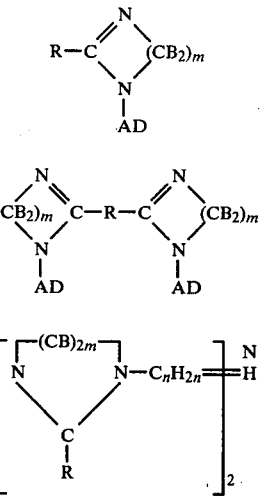

(1)

(2)

(3)

where

and

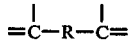

are the residues derived from the carboxylic acid, for example, any of those mentioned above, such as where R is a hydrocarbon radical having, for example, 1-30 carbons or more, a saturated or unsaturated aliphatic radical, a cycloaliphatic radical, an aryl radical, an aralkyl radical, an alkaryl radical, an alkoxyalkyl radical, an aryloxyalkyl radical and the like, m is 2, or 3, B is hydrogen or a hydrocarbon radial, for example, a lower alkyl radical, i.e., $(CB_2)_n$ can be a divalent radical having 2 or 3 carbons in its main chain, for example, a divalent radical of the formula $$-CH_2-CH_2-, \quad -CH_2-CH_2-CH_2-,$$

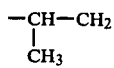

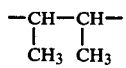

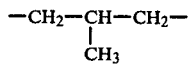

etc.; and AD is hydrogen or the residue of the polyamine wherein A is, for example, $$-C_nH_{2n}-NR-;$$

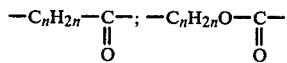

$$-C_nH_{2n}-O-; \quad -C_nH_{2n}-NR'-C_nH_{2n}-NR'-$$

$$-C_nH_{2n}-NR'-C_nH_{2n}-NR'-C_nH_{2n}-NR'$$

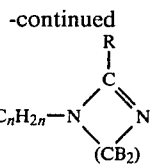

etc., and D and R' are hydrogen or a hydrocarbon radical, for example, aliphatic, cycloaliphatic, etc., and n is a whole number, for example, 1-6, but preferably 2 or 3. Any suitable cyclic-amidine-forming polyamine can be employed. Examples of suitable polyamines employed in preparing cyclic amidines comprise ethylene diamine, diethylamine triamine, triethylene tetramine, tetraethylene pentamine, 1,2-diaminopropane, N-ethyl ethylene diamine, N,N-dibutyl diethylene triamine 1,2-diaminobutane, hydroxyethyl ethylene diamine, etc. Cyclic-amidine-forming amines are well known and have been described, for example, in the above patents and publications.

The preferred class of cyclic amidines comprises imidazolines of the formula:

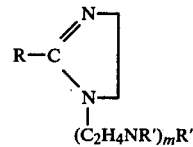

where R is a hydrocarbon group having a 8-32 carbon atoms, R' is hydrogen or a hydrocarbon radical, but preferably hydrogen and m is a small number, usually less than 6, but preferably 1-3.

Examples and the preparation of suitable imidazolines can be found in U.S. Reissue Pat. No. 23,227 and suitable tetrahydropyrimidines in U.S. Pat. No. 2,640,029. The cyclic amidines of the present invention are prepared in a similar manner.

From a practical standpoint, however, the most readily available polyamines are diethylene triamine, triethylene tetramine, and tetraethylene pentamine. No particular advantage has been found in using other polyamines in which some other divalent radical such as

is used.

Salts of cyclic amidines are useful in this invention such as salts of the carboxylic acids described above.

Specific examples of carboxylic salts which are preferred include the following:

C 36 dimeric acids, trimeric, and other polymeric acids fatty acids such as oleic acid, stearic acid, linoleic acid, etc. dimerized tall oil acids, etc.

These acids are used to form salts of cyclic amidines, such as imidazolines.

F. Trithiones

Sulfur compounds of this invention (also referred to as Trithiones) are exemplified by 1,2-dithiole-3-thione and quaternaries thereof, as referred to as 1,2-dithiolium compounds. These are described in U.S. Pat. No.

3,959,177 issued May 25, 1976 and is by reference incorporated herein as if part hereof.

1,2-dithiole-3-thiones are known compounds prepared by a variety of methods. Examples of such compounds, and methods for their preparation, are disclosed in THE CHEMISTRY OF HETEROCYCLIC COMPOUNDS, "Multi-Sulfur and Sulfur and Oxygen Five-and Six-Membered Heterocycles," PART 1, pages 237–386, by David. S. Breslow et al, Interscience Publishers, 1966.

1,2-dithiole-3-thiones may be expressed by the formula:

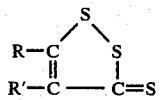

where R and R' are substituted groups, for example, alkyl, aryl, cycloalkyl, alkenyl, alkynyl, alkaryl, aralkyl, heterocyclic, etc. In addition, one of the above R's may be hydrogen. Examples of a wide variety of 1,2-dithiole-3-thiones are presented in the above text by Breslow et al in Table 4, pages 352–366, which is incorporated into this application as if part hereof.

1,2-dithiole-3-thiones are conveniently prepared by the classic method of reacting an olefin with sulfur, for example, according to the following equation:

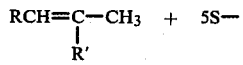

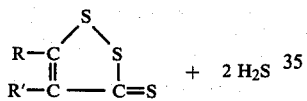

The olefin employed in the reaction contains
1. a reactive double bond
2. a primary carbon atom
3. at least four hydrogen atoms on the 3 terminal carbons with at least one hydrogen on the carbon beta to primary carbon atom.

This reaction is carried out at any suitable temperature and time, for example, at about 100° to 300° C., such as from about 140° to 240° C., but preferably from about 160° to 220° C. for a period of about 2 to 160 hours, and about 10 to 50 hours, but preferably about 15 to 40 hours.

Quaternaries or thionium compounds have been prepared from these compounds according to the following reaction:

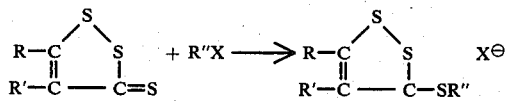

where R"X is a quaternizing compound.

Examples of quaternaries or thionium derivatives of 1,2-dithiole-e-thiones are presented in Table 7 of Breslow et al., pages 394–6, which is incorporated by reference into this application as if part hereof.

The thionium compounds are prepared by reacting the 1,2-dithiole-3-thiones with any suitable quaternizing agent at suitable temperatures and times, such as a temperature of from about 40° to 200° C., but preferably from about 50° to 180° C., for a period of about 1 to 24 hours, such as about 2 to 15 hours, but preferably 3 to 6 hours.

The following examples are presented by way of illustration and not of limitation.

F. Series of Examples

EXAMPLE 1

The Preparation of 4-phenyl-,2-dithiole-3-thione

In a suitable reactor equipped with a stirrer, thermometer and a reflux condenser, was placed 118 g. of methylstyrene and 48 g. of sulfur. The mixture was heated for 37 hours at 200°–210° C. After the reaction was completed, the mixture was slowly cooled to room temperature. The product was collected and crystallized from benzene, red crystals (32 grams, 50% yield), M.P. 122°–124° C.

Method A.—Quaternization of 4-phenyl-1,2-dithiole-3-thione in the presence of solvent-isopropanol with $(CH_3)_2SO_4$ A sample of 21.0 g. of 4-phenyl-1,2-dithiole-3-thione (Ex. 1) and 12.6 g. of dimethylsulfate $(CH_3)_2SO_4$ in 180 cc. of isopropanol was refluxed for 24 hours. After this period 4.5 g. of the product was removed by decanting the hot isopropanol solution. After the isopropanol cooled to room temperature, crystallization took place. The crystals, 3 g. were identified as unreacted starting material. Yield was 64%.

Method B.—Quaternization of 4-phenyl-1,2-dithiole-3-thione in the presence of solvent-benzene with $(CH_3)_2SO_4$ A sample of 8.4 g. of 4-phenyl-1,2-dithiole-3-thione (Ex. 1) and 5.0 g. of dimethylsulfate in 100 cc. of benzene was refluxed for 24 hours. The product was dissolved in a mixture of 100 cc. $H_2O$ and 10 cc. of acetone. About 1.0 g. of by-product was formed. Yield was 85%.

EXAMPLE 2

Preparation of 4-(3-methoxy-4-hydroxy) phenyl-1,2-dithiole-3-thione

In a suitable reactor equipped with a stirrer, thermometer, addition funnel and reflux condenser was placed, 32 g. of sulfur, 1.0 g. of di-o-tolyguanidine as catalyst and 150 cc. of mesitylene as solvent. The mixture was brought to a reflux (170° C.) and over a 1 hour period 66 g. of isoeugenol

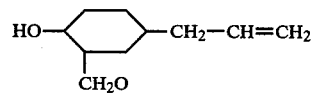

was added dropwise. Reflux was continued for 48 more hours. The mesitylene was decanted from the solid. The solid was treated twice with 500 cc. portion of a 5% aqueous potassium hydroxide solution. Upon acidification the product precipitated as a brown solid.

A 5.2 g. sample of 5-(3-methoxy-4-hydroxy)phenyl-1,2-dithiole-3-thione was quaternized following Method B, (with benzene as a solvent) the yield was 40%.

Method C.—Quaternization without solvent with (CH₃)₂SO₄

A 17.0 g. sample of 5-(3-methoxy-4-hydroxy)phenyl-1,2-dithiole-3-thione and 8.5 g. of dimethyl sulfate were heated for 1 hour at 100°–120° C. After the reaction was completed 25.5 g. of isopropanol was added to give a homogeneous solution. Yield was quantitative.

EXAMPLE 3

Preparation of 4-neopentyl-5-t-butyl-1,2-dithiole-3-thione

To a mixture of 320 g. of sulfur and 6.0 g. of di-o-tolylguanidine was added over a 9 hour period, at a reaction temperature of 210°–215° C., 336 g. of triisobutylene, Mainly (CH₃)₂C—CH₂C=CH—C(CH₃)₂
                      |
                      C Heating at 210°–215° C. was continued for an additional 14 hours. The product was distilled and there was collected 220 g. 4-neopentyl-5-t-butyl-1,2-dithiole-3-thione, B.P. 155°–185° C. (3–4 mm. Hg).

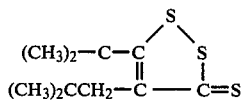

Quaternization according to Method A (with isopropanol as solvent) failed. The use of acetic acid as the solvent in the quaternization was unsuccessful. Method C (without solvent), however, converted 4-neopentyl-5-t-butyl-1,2-dithiole-3-thione quantitatively to its quaternary methosulfate.

Method D.—Quaternization of 4-neopentyl-5-t-butyl-1,2-dithiole-3-thione with methyl iodide employing chloroform as solvent A sample of 3.0 g. of 4-neopentyl-5-t-butyl-1,2-dithiole-3-thione and 6.0 g. of methyl iodide in 50 cc. of chloroform was allowed to stand overnight. The solvent was removed and the orange solid washed with isopropanol and benzene, M.P. 135°–142° C. Yield was 3.8 g. (82%).

EXAMPLE 4

Preparation of 4,5-tetramethylene-1,3-dithiole-3-thione

In a suitable reactor equipped with a stirrer, reflux condenser, thermometer and addition funnel was placed 24 g. of sulfur, 171 g. of carbon disulfide and 150 cc. of dimethyl formamide. The mixture was cooled to 0° C. and under continuous stirring and cooling 132 g. of 1-morpholino-1-cyclohexene was introduced over a ½ hour period. After the addition was completed, stirring was continued for an additional 16 hrs. The resulting slurry was poured into water and the resulting orange solid crystallized from acetone, M.P. 95°–97° C. Yield 37%.

Method A.—Quaternization of 4,5-tetramethylene-1,2-dithiole-3-thione in the presence of solvent-isopropanol A sample of 11.3 g. of 4,5-tetramethylene-1,3-dithiole-3-thione and 7.6 g. of dimethyl sulfate in 100 cc. of isopropanol was refluxed for 24 hrs. During this time hydrogen sulfide is evolved. After the reaction was completed 5 g. of a hard blue solid crystallized from the solution. The nuclear magnetic resonance spectrum of the product is consistent with the following structure:

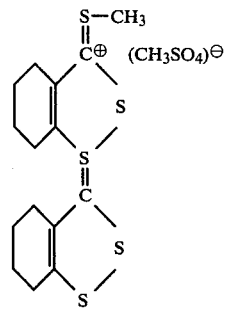

The mother liquor contained 50% of 3-S-methyl-4,5-tetramethylene-1,2-dithiole-3-thione methosulfate.

Any suitable quaternizing agent may be employed, for example, (1) Alkyl halides such as methyl iodide, butyl iodide, butyl bromide, etc.

(2) Sulfuric acid and derivatives H₂SO₄, R₂SO₄ where R is alkyl, etc., methyl, ethyl, etc., for example (Me)₂SO₄

(3) Alkyl thioureas such as methyl thiourea, etc.

(4) Sulfonate esters, for example

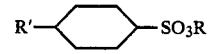

where R is alkyl such as methyl, etc., and R is hydrogen, alkyl, etc. for example methyl p-toluene sulfonates.

(5) Alkyl phosphates, e.g. (MeO)₃PO, (EtO)₃PO, etc.

The following are the specific compositions employed in the Examples.

I. Sulfur-oxygen Phosphate was prepared according to Ex. 1 of the C Series of Examples. Its composition approximates the following:

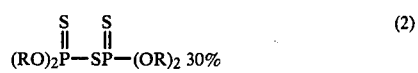

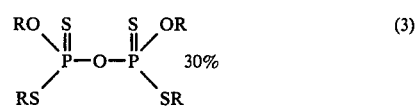

where R=Alfol C₈₋₁₀+1 wgt. EtO, i.e., R(OEt)ₙOH when n=3.3.

II. Dimethylbenzyl coco ammonium chloride has the idealized formula

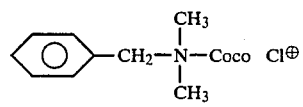

III. Polyphosphate ester of oxyalkylated Alfol is prepared according to Ex. 11 of the C Series of Examples. It has the general formula

where R is Alfol 8–10 oxyethylated with 0.8 parts of wgt. of ethylene oxide of the general formula $R(OEt)_n$ where $n=2.6$.

IV. The cyclic amidine is an imidazoline prepared from Tall oil and Tetraethylenetriamine to yield a compound of the idealized formula

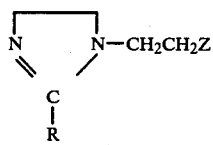

where $Z=NH_2$ or

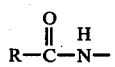

as a salt of dimeric and/or trimeric acid.

V. Phosphate salt of cyclic amidines is an imidazoline made according to Table IV Ex. 8 of the D Series of Examples having the formula

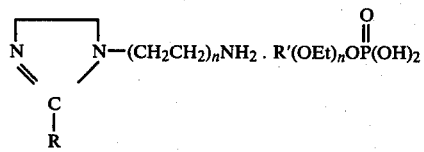

where R is $C_{17}H_{33}$

R' is Alfol $C_{8-10}$ oxyethylated with Z wgt. of EtO to yield $n=3.3$.

VI. Trithione is prepared according to Example 3 Method D of the F Series of Examples to yield the methyl quaternary of 4-neopentyl-5-t-butyl-1,2-dithiole-3-thione, i.e.

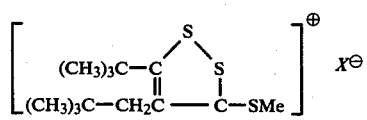

X=halogen.

We claim:

1. Compositions useful as a corrosion inhibitor in limited oxygen aqueous system characterized by containing at least two of the following:
   (1) sulfur-oxygen phosphates
   (2) fatty quaternaries
   (3) polyphosphate esters
   (4) cyclic amidines
   (5) trithiones.

2. A composition of claim 1, useful as a corrosion inhibitor in sour limited oxygen aqueous systems, which comprises:
   (1) sulfur-oxygen phosphates
   (2) fatty quaternaries
   (3) polyphosphate esters.

3. A composition of claim 1, useful in a sour limited oxygen hydrocarbon/aqueous system, which comprises:
   (1) sulfur-oxygen phosphates
   (2) fatty quaternaries
   (3) cyclic amidines.

4. A composition of claim 1, useful as a corrosion inhibitor in a sweet limited oxygen aqueous system, which comprises:
   (1) sulfur-oxygen phosphates
   (2) polyphosphate esters.

5. A composition of claim 1, useful as a corrosion inhibitor in a sweet limited oxygen hydrocarbon/aqueous system, which comprises:
   (1) trithiones
   (2) cyclic amidines
   (3) polyphosphate esters.

6. The composition of claim 2 where
   (1) the sulfur-oxygen phosphate is the reaction product of an oxyalkylated fatty alcohol and $P_2S_5$
   (2) the fatty quaternary is dimethyl benzyl fatty ammonium halide
   (3) the polyphosphate ester is an ester of an oxyalkylated fatty alcohol.

7. The composition of claim 3 where
   (1) the sulfur-oxygen phosphate is the reaction product of $P_2S_5$ and an oxyalkylated fatty alcohol
   (2) the fatty quaternary is dimethyl benzyl fatty ammonium halide
   (3) the cyclic amidine is a fatty carboxylic acid salt of an imidazoline.

8. The composition of claim 4 where
   (1) the sulfur-oxygen phosphate is the reaction product of $P_2S_5$ and an oxyalkylated fatty alcohol
   (2) the polyphosphate ester is an ester of an oxyalkylated fatty alcohol.

9. The composition of claim 5 where
   (1) the trithione is a quaternary of 4-neopentyl-5-t-butyl-1,2-dithiole-3-thione
   (2) the cyclic amidine is a salt of a phosphate ester of an oxyalkylated fatty alcohol and an imidazoline
   (3) the polyphosphate ester is a polyphosphate ester of an oxyalkylated fatty alcohol.

10. A process of inhibiting corrosion which comprises treating a limited oxygen aqueous system with the composition of claim 1.

11. A process of inhibiting corrosion which comprises treating a limited oxygen aqueous system with the composition of claim 2.

12. A process of inhibiting corrosion which comprises treating a limited oxygen aqueous system with the composition of claim 3.

13. A process of inhibiting corrosion which comprises treating a limited oxygen aqueous system with the composition of claim 4.

14. A process of inhibiting corrosion which comprises treating a limited oxygen aqueous system with the composition of claim 5.

15. A process of inhibiting corrosion which comprises treating a limited oxygen aqueous system with the composition of claim 6.

16. A process of inhibiting corrosion which comprises treating a limited oxygen aqueous system with the composition of claim 7.

17. A process of inhibiting corrosion which comprises treating a limited oxygen aqueous system with the composition of claim 8.

18. A process of inhibiting corrosion which comprises treating a limited oxygen aqueous system with the composition of claim 9.

* * * * *